(12) United States Patent
Takahashi et al.

(10) Patent No.: US 8,429,749 B2
(45) Date of Patent: Apr. 23, 2013

(54) PACKET DATA COMPARATOR AS WELL AS VIRUS FILTER, VIRUS CHECKER AND NETWORK SYSTEM USING THE SAME

(75) Inventors: Eiichi Takahashi, Tsukuba (JP); Masahiro Yasuda, Tsukuba (JP); Yosuke Iijima, Tsukuba (JP); Masahiro Murakawa, Tsukuba (JP); Kenji Toda, Tsukuba (JP); Tetsuya Higuchi, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1119 days.

(21) Appl. No.: 12/055,651

(22) Filed: Mar. 26, 2008

(65) Prior Publication Data
US 2009/0044275 A1 Feb. 12, 2009

(30) Foreign Application Priority Data
Mar. 27, 2007 (JP) ................................. 2007-080504

(51) Int. Cl.
*H04L 29/06* (2006.01)

(52) U.S. Cl.
USPC ............................................. 726/24; 726/22

(58) Field of Classification Search ...................... 726/24
See application file for complete search history.

(56) References Cited

U.S. PATENT DOCUMENTS

| | | | | |
|---|---|---|---|---|
| 2002/0166085 A1* | 11/2002 | Peikari | ............................. | 714/38 |
| 2005/0050378 A1* | 3/2005 | Liang | ................................. | 714/4 |
| 2005/0108573 A1* | 5/2005 | Bennett et al. | ................ | 713/201 |
| 2005/0210291 A1* | 9/2005 | Miyawaki et al. | ............ | 713/201 |
| 2006/0095970 A1* | 5/2006 | Rajagopal et al. | ............. | 726/25 |

FOREIGN PATENT DOCUMENTS

| | | |
|---|---|---|
| JP | 10-049365 | 2/1998 |
| JP | 10-307776 | 11/1998 |
| JP | 2001-508564 | 6/2001 |
| WO | WO 98/14872 | 4/1998 |
| WO | 2004/075056 A1 | 9/2004 |

\* cited by examiner

*Primary Examiner* — Edward Zee
*Assistant Examiner* — Yogesh Paliwal
(74) *Attorney, Agent, or Firm* — Oblon, Spivak, McClelland, Maier & Neustadt, L.L.P.

(57) ABSTRACT

A network system by the present invention can quickly detect viruses and does not easily become a new cause of vulnerability. A packet data comparator branches inputted packet data into three branches, and includes an additional pattern matching unit which compares the branched data with the stored data and performs matching with collation patterns stored in a rewritable storage area, a fixed pattern matching unit which compares the branched data with the stored data and performs the matching with a logical operation configured with known collation patterns, a notification packet matching unit which compares the branched data with the stored data and finds a notification packet, and an identity detection aggregation unit which aggregates results from the respective matching units. Moreover, a virus filter, a virus checker, and a secure network system are realized by using the present invention.

13 Claims, 9 Drawing Sheets

PACKET DATA COMPARATOR AS WELL AS VIRUS FILTER, VIRUS CHECKER AND NETWORK SYSTEM USING THE SAME

BACKGROUND OF THE INVENTION

1. Field of the Invention

The present invention relates to a packet data comparator, as well as a virus filter, a virus checker and a network system using the same which can quickly detect harmful data which is referred to as "computer virus" or "network virus" or simply as "virus", or other hazardous data partly similar to the harmful data, from digital data obtained via a communication network.

2. Description of the Prior Art

As the number of computers connecting to one communication network increases, amount of data flowing through the communication network dramatically increases. These data may include a computer virus (or a network virus or harmful data similar to it) which harms operations of the computer. Consequently, in order to keep integrity of the computer connecting to the network, information data accumulated therein or the like, there is a growing need for monitoring the computer virus flowing through the network.

Conventionally, such monitoring of the computer virus has been performed by using dedicated software in individual computers, devices which relay the data or the like. Some examples are shown in the following prior art references.

JP-T 2001-508564 discloses detection and removal of a virus in a macro command. A macro virus detecting module includes a macro locating and decoding module, a macro virus scanning module, a macro repairing module, a file correcting module and a virus information module, and their respective functions are as follows. The macro locating and decoding module determines whether or not a targeted file includes the macro, and if the targeted file includes the macro, the macro locating and decoding module locates the macro and decodes the macro to produce a decoded macro. The macro virus scanning module accesses the decoded macro and scans the macro to determine whether or not the macro includes the virus. Detection of an unknown macro virus is performed by the macro virus scanning module based on loading of comparison data including an instruction identifier set from the virus information module and determination of whether or not the above described decoded macro includes a suspect instruction combination corresponding to the above described instruction identifiers. The macro repairing module uses the above described comparison data to locate a suspect instruction in the above described decoded macro and removes the suspect instruction to produce a repaired macro. The file correcting module accesses the targeted file including a infected macro and replaces the infected macro with the repaired macro from the macro processing module.

JP-A 1998-307776 discloses a computer virus reception monitoring device and a system thereof which prevent a receiving device connected to a computer line network from receiving communication data infected by a computer virus to prevent computer virus infection in the receiving device from occurring. This causes the computer virus reception monitoring device to intervene between the computer line network and the receiving device, and the computer virus reception monitoring device is provided with reception processing means which receives the data from the computer line network, received data processing means which diagnoses whether or not the received data received by the above described reception processing means has been infected by the computer virus, means of processing communication with the receiving device which, if the above described received data has been infected by the above described computer virus, notifies a infection signal showing this infection to the receiving device, and transmission processing means which, if the above described received data has not been infected by the above described computer virus, transmits the above described received data to the above described receiving device.

JP-A 1998-049365 discloses a floppy disk drive which can prevent virus contamination in a computer system. In this disclosure, the floppy disk drive is provided with a buffer which temporarily stores data read from a floppy disk in accordance with a data read request from the computer system, a ROM in which a virus checking program has been stored, a virus checking control unit consisting of a virus checking controller which operates according to the virus checking program to check whether or not a virus exists in the data stored in the buffer, and a cache memory which holds the data from the floppy disk in which no anomaly has been found as a result of the virus checking and gives the data to the computer system. This disclosure prevents the virus contamination in the computer system from occurring when the computer system itself checks whether or not the virus exists.

However, according to an improvement in a transfer rate of a communication channel such as the network, amount of data flowing through the communication channel has increased. Since the amount of the data tends to further increase according to a speeding up of the communication channel, it is anticipated that, in virus monitoring system using software process, a processing speed of the system will not be able to follow this tendency over time and for a personal computer a CPU load will be so high that the processing speed becomes a bottleneck.

Generally, hardware processing speed can be more accelerated in comparison with software processing. Therefore, with respect to the data on the communication channel, it is possible to keep delay less and perform the monitoring more rapidly in the hardware processing. However, generally, if the virus has been updated, it is necessary to modify virus check patterns. In order to perform the modification, data which is formed in virus checking hardware and becomes a monitoring target, that is the virus check patterns, has to be modified. In this is case, the modification of the virus check patterns means modification of the hardware. Since such modification of the hardware is not easy, this is not adequate to be used for responding by adapting it to the monitoring target data changing from day to day.

In order to solve this problem, a virus checking device using a rewritable or reconfigurable LSI logical device or the like, which is referred to as "FPGA (Field Programmable Gate Array)", "CPLD (Complex Programmable Logic Device)" or the like, has been disclosed, for example, in WO 2004/075056 A1.

However, the above described rewritable logical device such as the FPGA or the CPLD can be caused to malfunction by the computer virus due to its high versatility, which means that the rewritable logical device has a possibility of becoming a new security risk (that is, a risk of being targeted by the computer virus and the like). Moreover, since such a rewritable logical device generally cannot rewrite its own configuration data, it is necessary to prepare another CPU and the like for the rewriting.

SUMMARY OF THE INVENTION

It is an object of the present invention to realize a virus checking device which can rapidly detect harmful data such as virus in a communication network. However, this virus checking device does not require an additional circuit for update, and has a characteristic in which the virus checking device tends not to be a new security risk.

For the above described object, first, a packet data comparator which rapidly detects match or mismatch between packet data inputted from a data path connecting among information processing means and stored data is realized. A virus filter which rapidly detects a computer virus in the data path can be realized by using the packet data comparator. A virus checker which rapidly detects a virus in a bidirectional data path can be realized by using the virus filter. Furthermore, a network system provided with a virus checker which can be updated through a network can be realized by using the virus checker.

In the above described network system, data inputted from the communication network is collated with virus characterizing data by using virus checking hardware which is inserted into a communication channel of the communication network or added to a network card or the like. In other words, the present invention uses an advantage of hardware processing in which high speed processing is enabled in comparison with software processing. Consequently, intrusion of the harmful data, that is, the virus, into a personal computer and the like is detected in real time. In other words, it is possible to quickly detect the virus and take measures against the detected virus.

The present invention is based on comparison means which detects match or mismatch between packet data inputted from a data path connecting among information processing means and stored data. This comparison means is a packet data comparator, including:

branch means which branches the inputted packet data into at least three branches;

an additional pattern matching unit which has a function of comparing the branched packet data with a part of the stored data, and performs matching verification by comparison with collation patterns stored in a rewritable storage area;

a fixed pattern matching unit which has the function of comparing the branched packet data with the part of the stored data, and performs the matching verification with respect to the collation patterns, with a logical operation which has been configured based on known collation patterns;

a notification packet matching unit which has the function of comparing the branched packet data with the part of the stored data, and finds a notification packet; and an match detection aggregation unit which aggregates respective matching results from the above described additional pattern matching unit, the fixed pattern matching unit and the notification packet matching unit.

The above described packet data comparator outputs a result in which the match or the mismatch has been detected, from the above described match detection aggregation unit.

The logical operation performed in the above described fixed pattern matching unit can be performed by a hardware configured logical operation circuit.

Moreover, the logical operation performed in the above described fixed pattern matching unit can be performed by a programmed processing unit. In this case, it is important to perform the collation operation in accordance with a logical formula configured based on the fixed patterns.

Furthermore, the present invention is a virus filter which uses the above described packet data comparator and detects a computer virus in a data path. This includes:

a packet buffer which temporarily stores an inputted packet;

the above described packet data comparator which compares packet data stored in the above described packet buffer with stored filtering information;

packet output means which outputs a packet which is caused to pass through; and a virus filter control unit which controls the above described packet buffer, the packet data comparator and the packet output means. This virus filter detects the computer virus included in the packet data inputted from the data path. When the virus has been detected, it does not output the packet data.

Moreover, the virus filter of the present invention also further includes a notification packet generation unit which generates a notification packet for notifying a result of the comparison in the above described packet data comparator to the above described information processing means.

Moreover, the present invention is also a virus checker using the above described virus filter. This make it possible to detect a virus in a bidirectional data path. This virus checker includes:

first and second interface means which are connected to the above described data path, respectively;

an upward virus filter which performs filtering of a packet signal in an uplink from the first interface means toward the second interface means;

a downward virus filter which performs filtering of a packet signal in a downlink from the second interface means toward the first interface means; and update control means which provides upward and downward filtering information to the above described upward and downward virus filters, respectively.

Moreover, the present invention is a network system using the above described virus checker. Here, the above described data path is a network and the network system includes:

the above described virus checker which is connected to the above described network;

information processing means which is connected to the above described network via the above described virus checker;

a virus information data server which is connected to the above described network and provides virus information; and a virus checker update server which is connected to the above described network and updates information stored in the virus checker.

Further features of the invention, its nature and various advantages will be more apparent from the accompanying drawings and following detailed description of the invention.

DESCRIPTION OF THE PREFERRED EMBODIMENT

Figure 1:
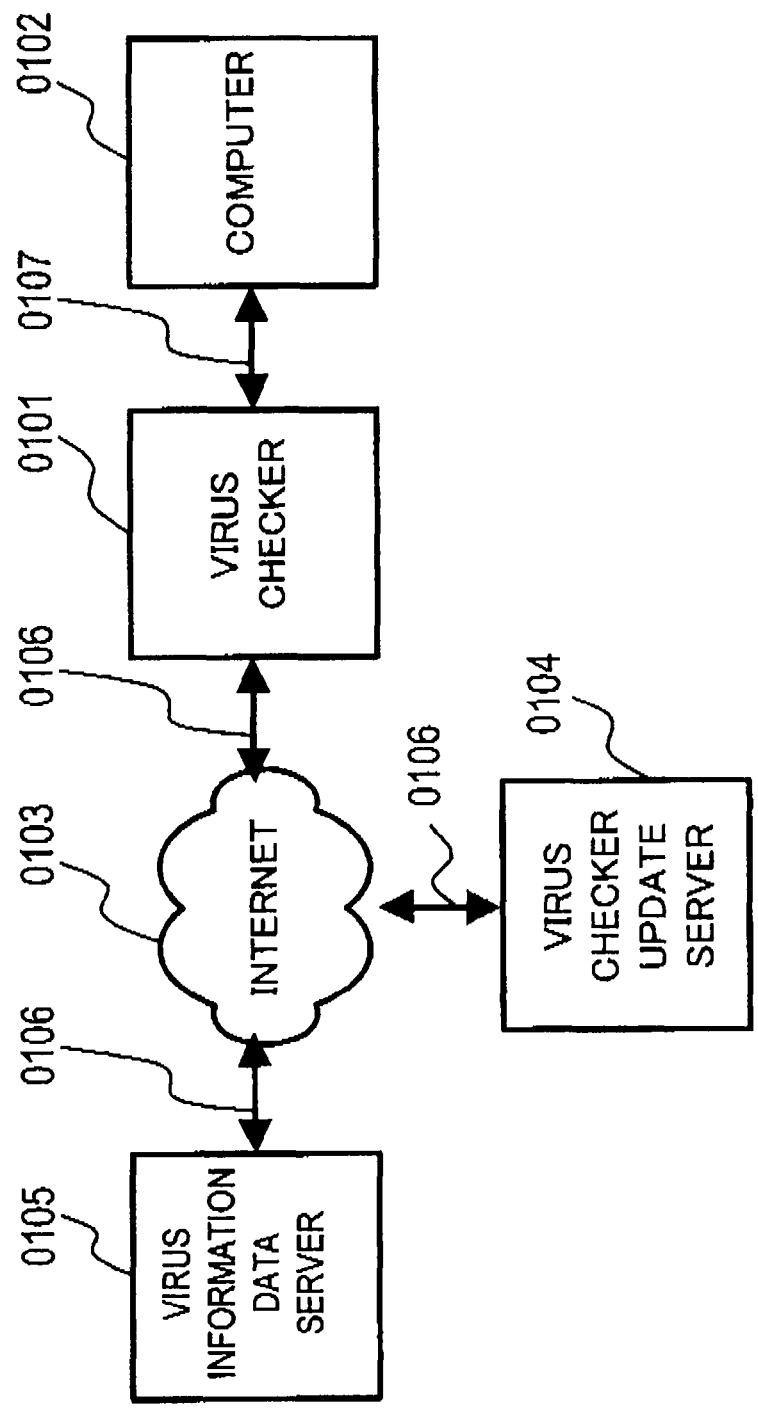
FIG. 1 is a diagram representing a configuration example of an entire virus checking system according to an example of the present invention.

Hereinafter, an embodiment of the present invention will be described in detail based on the drawings. In the following description, the same reference numerals are used for devices having the same functions or similar functions if there is no particular reason. It should be noted that descriptions of elements which are not directly related to the gist of the present invention, such as elements related to power supply, are omitted in each figure even if such elements are required for circuit operations.

The present invention is applied to an information processing terminal communicable with another information processing apparatus via a communication network such as a wide area network like the Internet or a LAN (Local Area Network) like Ethernet (registered trademark), and performs virus checking. In this virus checking, virus intrusion into a personal computer and the like is sensed in real time by using virus checking hardware to collate data inputted from the communication network with virus characterizing data which has been previously prepared. This real time action is realized by performing the virus checking with hardware inserted into the network or hardware added to a network card (NIC: Network Interface Card). This configuration enables quick virus detection and accordingly it is possible to take measures which have been previously determined.

Moreover, although it is desired to modify a virus definition file also in the hardware used as described above, there is typically a problem in which such modification is difficult. With respect to this difficulty, the present invention performs modification of the hardware corresponding to this modification of the virus definition file by modifying virus patterns. For this modification, a memory dedicated to retaining the virus patterns for the collation is prepared and contents of the memory are rewritten to handle this modification. The above described virus patterns do not mean virus data itself but mean hardware patterns which can detect some kind of virus.

In addition to this, in the present invention, a process corresponding to so-called "wild card" of undefined length can be performed. For this purpose, a circuit for performing a logical operation with respect to a result of matching of partial patterns is prepared, and modification of the logical operation is performed by switching connection of the circuit. This circuit modification is performed by reconfiguration of the circuit. In other words, the virus patterns in a logical device are updated by switching the circuit configuration. To perform this reconfiguration, the virus patterns have to be updated by copying virus definition information in a server device or reconfiguration data generated based on this information to a virus checking device.

Within the virus checking device, the collation patterns are retained on the memory, and a register circuit is used therefor in order to realize rapid collation. In this way, the circuit is configured so that memory read may not be a bottleneck. Such a configuration enables update of the collation patterns while realizing a high-speed property of the device caused by hardware implementation. As this result, even if traffic is increased by acceleration of the speed of the communication network, virus verification can be rapidly performed without imposing a load on a CPU of a terminal personal computer.

Data for updating the collation patterns retained in the virus checking device can be delivered from a server device and the like via the communication network. In this case, a control unit which updates the collation patterns and the like is further provided in the virus checking device. Moreover, when the data to be delivered becomes large, it is also possible to deliver only a difference or use a data compression technique.

Generally, a PLD (Programmable Logic Device) cannot rewrite its own configuration data. Consequently, as described in WO 2004/075056 A1, conventionally, in order to realize rewriting of the PLD or the like, it has been necessary to prepare a small CPU (Central Processing Unit) or the like such as a PIC (Peripheral Interface Controller) within the virus checking device.

Next, a method of delivering update data such as the collation patterns from the server device in the present invention will be described.

(1) Each virus checking device checks for the update of the collation patterns with respect to the server device at regular intervals.

(2-1) In response to this, if there is no update, the server device ignores the check, or (2-2) if there is collation pattern data for the update, the server device delivers the collation pattern data.

(3) After the collation pattern data has been completely accumulated in a buffer in the device, (4) when communication is put into an idle state, an update control circuit in the device temporarily stops the network.

(5) After the update has been performed with the collation patterns, the network is restarted.

It should be noted that, a secure scheme such as a digital signature or encryption is preferably used when the update data is delivered.

The virus checking device according to the present invention can be inserted into a communication channel in the network as described above. Furthermore, in combination with a communication protocol, the virus checking device according to the present invention can be inserted into a wide range of communication channels such as the network, an IDE cable and a data bus. Although power supply is required if the virus checking device according to the present invention is used as an external device for a computer, there is no constraint on a supply method, and in addition to a method of supplying power from a normal commercial power receptacle, the power can also be supplied, for example, via a cable for the Ethernet (registered trademark). Moreover, the virus checking device according to the present invention can be embedded in a USB-connected network adapter and also can be embedded in an IEEE 1394-connected network adapter.

Moreover, the above described virus checking device can also be integrated in a computer terminal. For example, the virus checking device can also be embedded on an Ethernet (registered trademark) adapter card (NIC) integrated in the computer. The above described virus checking device can also be similarly integrated in a wireless LAN adapter, a wireless LAN PCMCIA (Personal Computer Memory Card International Association) card adapter or the like integrated in the computer.

The virus checking device of the present invention may have a configuration in which the following circuits are combined.

(1) A circuit which holds all collation patterns for the virus checking on the memory, reads the collation patterns from the memory, and collates the collation patterns with data inputted from the communication channel; and (2) a collation logical circuit in which the collation patterns which have become apparent since some point in time are expanded in a logical circuit configuration. In this collation logical circuit, the data from the communication channel is inputted, and with reference to its output, collations between the collation patterns and the data inputted from the communication channel are executed.

In the above described virus checking device, the collation patterns are updated at regular intervals or depending on requests. Then, the virus definition file in which the above described collation patterns have been integrated can be converted into the collation patterns by conversion software and used as the update data. The conversion software can be easily created. Moreover, the virus definition file is placed on a server in the communication channel. Such conversion may be totally performed on the server or can also be performed on the virus checking device, or it is also possible to configure such conversion so that the virus definition file which has been partly converted is delivered to the virus checking device and the rest of the process is performed on the virus checking device.

In the above described collation logical circuit, as will be described in detail later in an example shown in FIG. 4, a logical circuit or the logical device is used to compare the virus definition file with the data flowing through the communication channel. If detection of a computer virus inserted in a content portion is performed, a preprocess for removing portions other than contents is applied with respect to a packet inputted from the communication channel. The input data applied with the preprocess as described above is compared with the virus definition file while passing through an input unit (FIFO) of the logical circuit. If the input data does not correspond to any data in the virus definition file, the input data directly passes through the input unit. If the input data corresponds (is identical) to any data in the virus definition file, the virus checking device 1) directly discards the above described input data, or 2) outputs alert information to perform a necessary process, for example, such as deleting the packet or performing notification to a receiver of the packet, as appropriate.

As described above, with respect to a computer virus which has already been apparent, digital data included in the packet passing through the communication channel is rapidly collated by the collation logic circuit (hereinafter referred to as "virus checker") included in the virus checking device. This configuration is significantly effective in a system for performing data transfer in ultra high speed, for example, such as over 1 Gbps.

Example 1

[Entire System Configuration]

FIG. 1 is an example of the present invention and shows a schematic configuration of an entire virus checking system. A computer 0102 which is a main body device has a virus checker 0101 which is a virus checking hardware device (device of the present invention) inserted into the side of an input communication channel with respect to a communication network 0106 connecting to the Internet 0103. Whether a communication network 0107 connecting the virus checker 0101 and the computer 0102 is the same medium as the communication network 0106 or a different medium has no effect on functions of the present invention, and the communication network 0107 may be a wired network such as the Ethernet or a wireless network such as a wireless LAN. For example, there may be a case where the communication network 0106 is 100BASE-TX and the communication network 0107 is 10BASE-T and the like. In addition to the personal computer (PC), the computer 0102 may be any information processing device connected to the communication network, such as a workstation, another desktop computer, a computer cluster, a large scale computer or a PDA (Personal Digital Assistant), or may be any equipment having the computer integrated therein, such as an information appliance.

This virus checker 0101 can sense or block the virus intrusion into the computer and the like in real time by collating the data inputted from the communication network 0106 with the virus characterizing data (virus patterns) and causing the input data to pass through or discarding the input data if necessary. Moreover, the virus patterns and a collation function device of the virus checker 0101 can respond to a virus which has newly emerged, and also can be configured by using a reconfigurable PLD or FPGA and the like, or without using them but with a dedicated LSI.

A virus checker update server 0104 receives the latest virus patterns from a virus information data server 0105 on the communication network 0106 if necessary, and uses the latest virus patterns to generate the data for updating the virus checker 0101. The virus checker update server 0104 and the virus information data server 0105 may be the personal computer, the workstation or the like, and any device which is connected to the Internet 0103 and has an ability to deliver the data with respect to another computer can be used for them. Moreover, the virus checker update server 0104 and the virus information data server 0105 may be directly connected to the virus checker 0101, connected to the virus checker 0101 via a network hub having a function of relaying communication data, connected to the virus checker 0101 by some kind of equipment having a function of connecting other relays or LANS to one another, or connected to the virus checker 0101 via the Internet as shown in FIG. 1.

Figure 2:
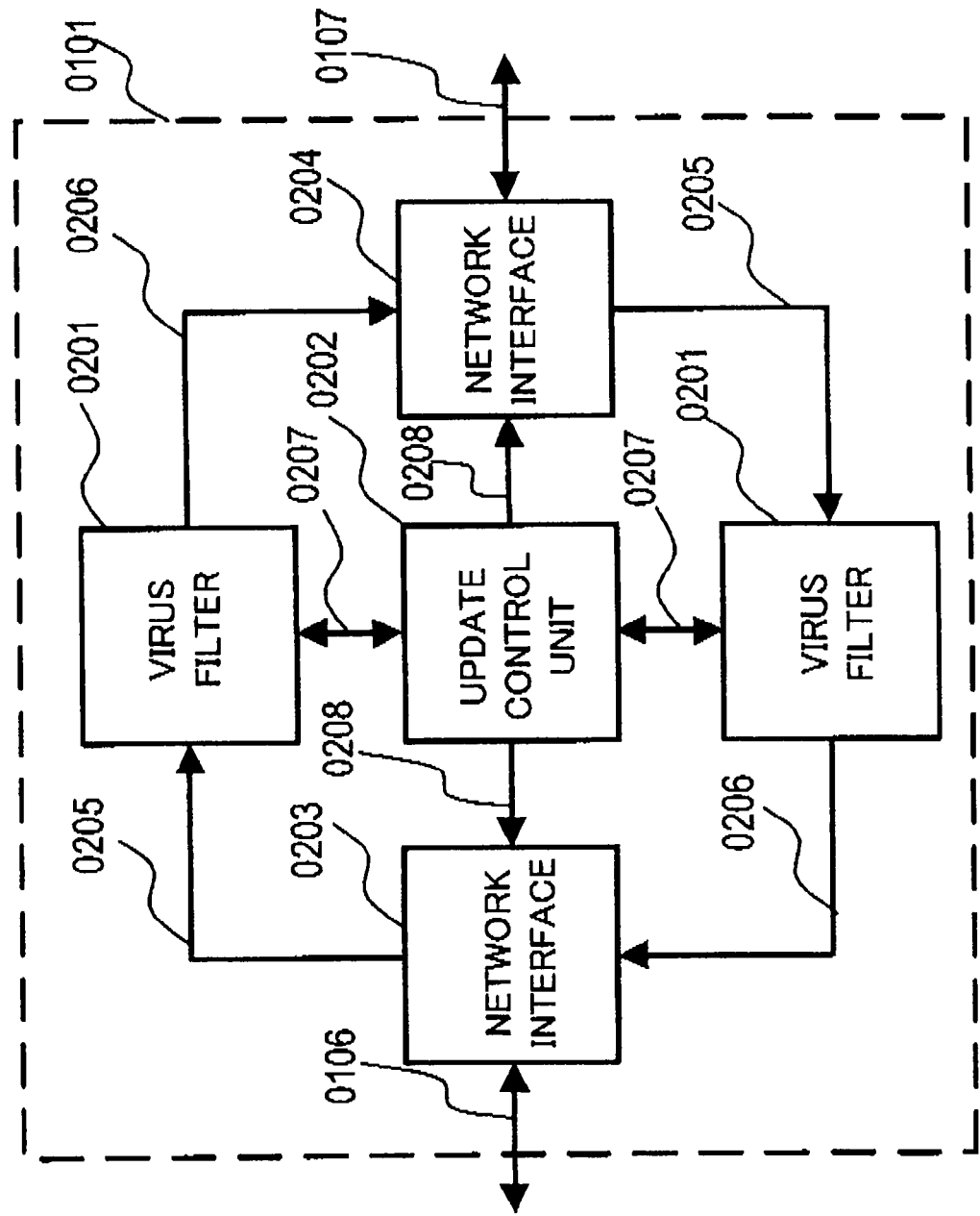
FIG. 2 is a diagram representing a configuration example of a virus checking device (virus checker) of an example of the present invention.

FIG. 2 is a diagram showing a configuration example of the virus checker 0101. The communication network 0106 connects to the outside along with the communication network 0107 on the side of the computer 0102, and is a data input channel through which external data flows in. Network interfaces 0203 and 0204 respectively connecting to the communication networks 0106 and 0107 have a function referred to as "physical layer" in the LAN. Here, the network interfaces 0203 and 0204 are only different in kinds of the networks to which they are connected. Moreover, the network interfaces 0203 and 0204 also have a function of separating and mixing network data inputs and outputs which are bidirectional, respectively. Moreover, two wirings 0205 are wirings through which data inputted to the network interfaces 0203 and 0204 flows respectively. Similarly, two wirings 0206 are wirings through which data outputted from the network interfaces 0203 and 0204 flows respectively. The respective wirings 0205 and 0206 are connected to their respective virus filters 0201, and the respective virus filters 0201 have a function of collating the network data with the virus patterns. Moreover, an update control unit 0202 controls an updating function for causing the virus checker to function with respect to the virus which has newly emerged. The update of the virus filters 0201 is controlled with control signal wirings 0207, and operations of the network during the update, such as the temporary stopping or the data accumulation, are controlled with interface control signal wirings 0208.

Figure 3:
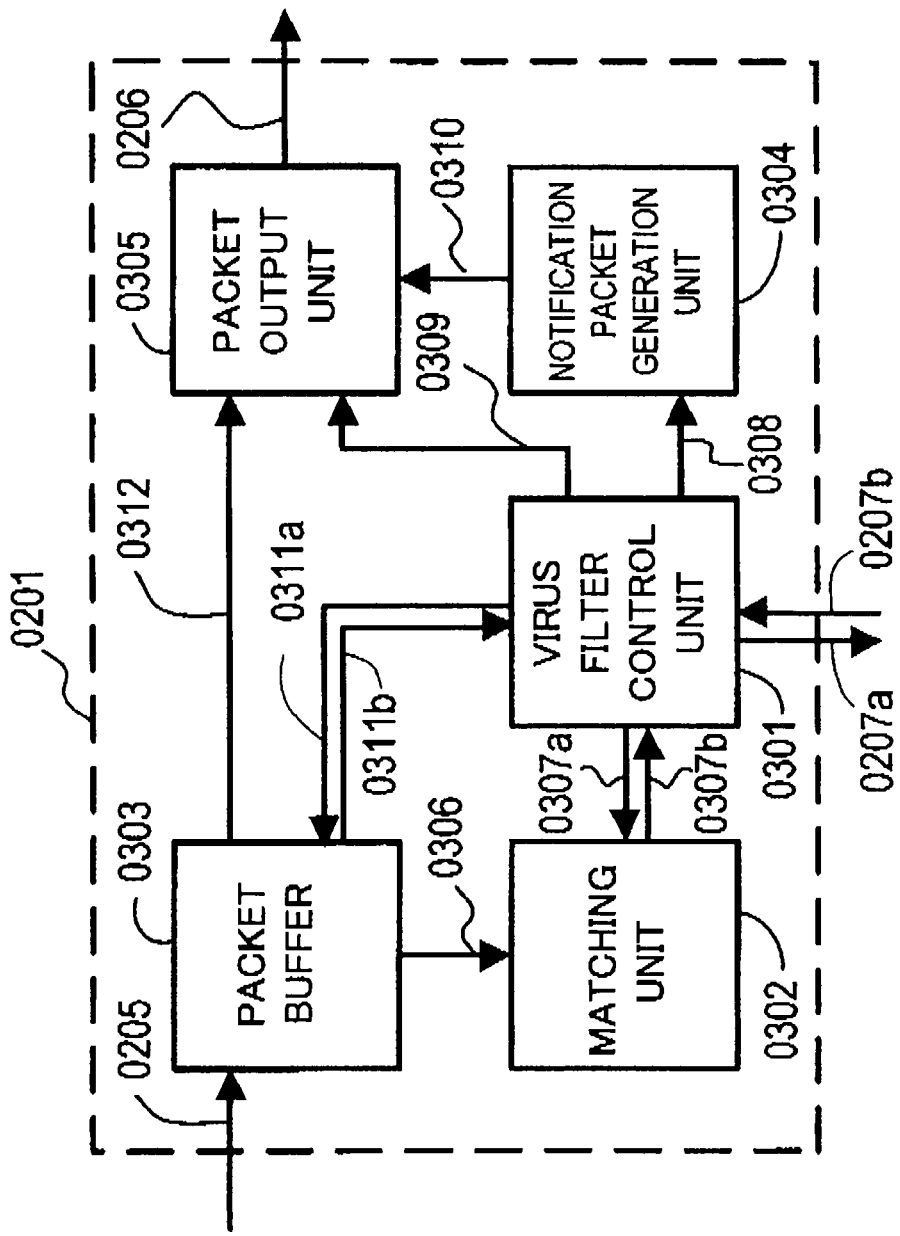
FIG. 3 is a diagram representing a configuration example of a virus filter.

FIG. 3 is a diagram showing a configuration example of the virus filter 0201. This configuration is provided with a packet buffer 0303 which temporarily accumulates a network packet which has arrived, a matching unit 0302 which collates actual data (referred to as "payload") in the packet with the virus patterns, a packet output unit 0305 which outputs the packet in the packet buffer which has been determined to be free of the virus, a notification packet generation unit 0304 which generates a packet for notifying detection of the virus or a packet to the computer 0102 inquiring whether or not there is the update of virus information to the virus checker update server 0104, and a virus filter control unit 0301 which controls the entire virus filter 0201. When a new packet arrives the packet buffer 0303, the arrival is notified to the virus filter control unit 0301 through a wiring 0311, and the payload in the packet which has arrived is transmitted to the matching unit 0302 through a wiring 0306. A collation result at the matching unit 0302 is transmitted to the virus filter control unit 0301 through a wiring 0307, and if it is not the virus, the virus filter control unit 0301 controls the packet output unit 0305 through a wiring 0309 to output the above described packet in the packet buffer 0303 through the wiring 0311.

As the result of the collation at the matching unit 0302, if the network packet which has arrived has been the data for updating the virus information, the above described packet is transmitted to the update control unit 0202 of FIG. 2 through the wiring 0207. For this purpose, the virus filter unit 0201 recognizes data showing that the packet is the data for updating the virus information, in addition to the virus information. This recognition data has been provided in either a header or the payload in the packet.

Conversely, if there has been an instruction for inquiring whether or not there is the update of the virus information from the update control unit 0202 through the wiring 0207, the virus filter control unit 0301 controls the notification packet generation unit 0304 through a wiring 0308 to generate an inquiry packet. The inquiry packet generated by the notification packet generation unit 0304 is transmitted to the packet output unit 0305 through a wiring 0310, and outputted through the wiring 0206 according to an instruction from the virus filter control unit 0301 to the packet output unit 0305 through the wiring 0309. Initialization of the respective parts within the virus filter 0201 is performed by the update control unit 0202 through the wiring 0207. Moreover, the update control unit 0202 writes the data to the respective parts via the virus filter control unit 0301.

Figure 4:
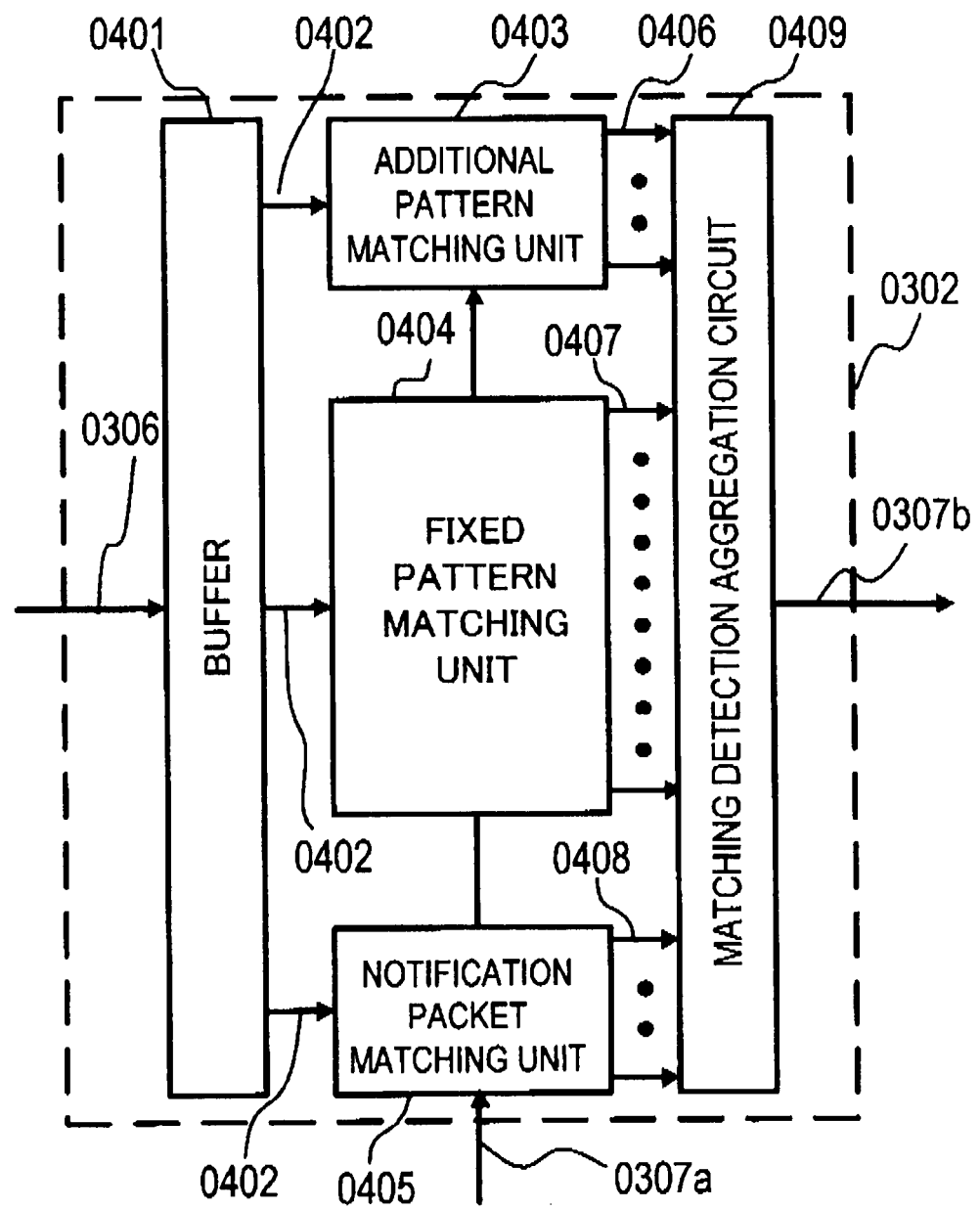
FIG. 4 is a diagram representing a configuration example of a matching unit.

FIG. 4 is a diagram showing a configuration example of the matching unit 0302. This configuration is provided with a buffer 0401 which copies the inputted payload and distributes the copy to subsequent three parts, an additional pattern matching unit 0403 which performs the matching with the collation patterns added for responding to the virus which has newly emerged, a fixed pattern matching unit 0404 which performs the matching in a pure logical circuit (a logical circuit not including a CPU operating with a program) which has been designed based on known collation patterns, a notification packet matching unit 0405 for finding a particular notification packet which includes a specific marker data and carries the update data and the like, and an matching detection aggregation circuit 0409 which aggregates matching results.

Respective outputs 0402 of the buffer 0401 are inputted to the additional pattern matching unit 0403, the fixed pattern matching unit 0404 and the notification packet matching unit 0405, respectively. On the other hand, all of outputs 0406 of the additional pattern matching unit 0403, outputs 0407 of the fixed pattern matching unit 0404 and outputs 0408 of the notification packet matching unit 0405 are connected to the matching detection aggregation circuit 0409, and an aggregated result is transmitted to the virus filter control unit 0301 through the wiring 0307. Wirings 0307*a* and 0307*b* realize bidirectionality in a pair, and the update of the additional pattern matching unit 0403 or the initialization of the notification packet matching unit 0404 is performed by the virus filter control unit 0301 through the wiring 0307*a*.

Figure 5:
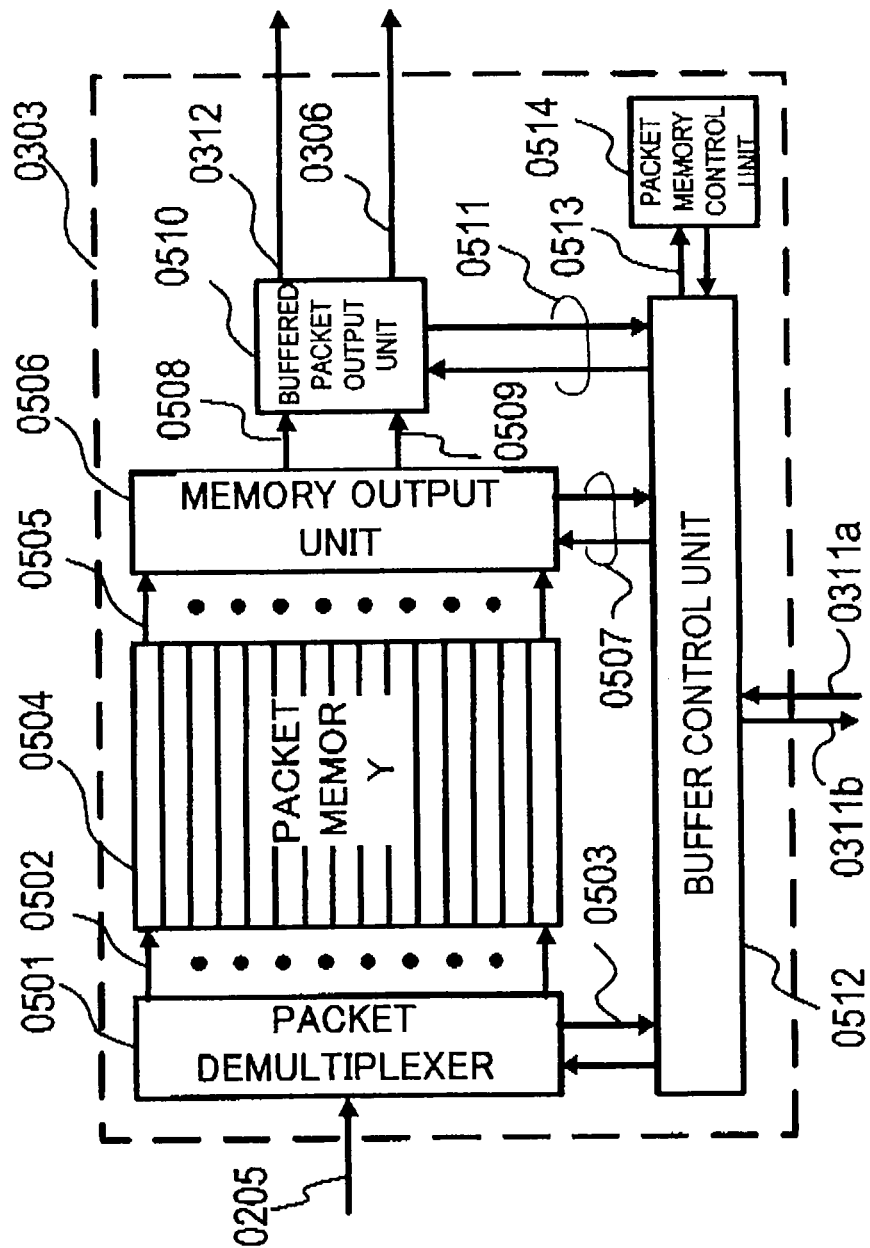
FIG. 5 is a diagram representing a configuration example of a packet buffer.

FIG. 5 is a diagram showing a configuration example of the packet buffer 0303. This configuration is provided with a packet memory 0504 which accumulates the arriving packet, a packet demultiplexer 0501 which distributes the arriving packet to an available packet memory, a memory output unit 0506 which selects a specified packet from the packet memory, a buffered packet output unit 0510 which selectively outputs some or all of the packet, a packet memory control unit 0514 which manages an availability of the packet memory 0504, and a buffer control unit 0512 which controls the entire packet buffer 0303.

The packet demultiplexer 0501 is directly connected to the packet memory 0504 and the packet memory 0504 is directly connected to the memory output unit 0506, via wirings 0502 and 0505, respectively. There are two kinds of wirings between the memory output unit 0506 and the buffered packet output unit 0510, and one of them is a wiring 0508 for outputting the packet itself and connects to a wiring 0312 via the buffered packet output unit 0510. The other one is a wiring 0509 for outputting only the payload in the packet to the matching unit 0302, and connects to the wiring 0306 similarly via the buffered packet output unit 0510. The availability of the packet memory 0504 is controlled by the packet memory control unit 0514, and the packet memory control unit 0514 is connected to the buffer control unit 0512 via wirings 0513. In addition to this, the packet memory control unit 0514 is connected to the packet demultiplexer 0501 via wirings 0503, to the memory output unit 0506 via wirings 0507, to the buffered packet output unit 0510 via wirings 0511, and to the virus filter control unit 0301 via wirings 0311*a* and 0311*b*, respectively, through the buffer control unit 0512.

Figure 6:
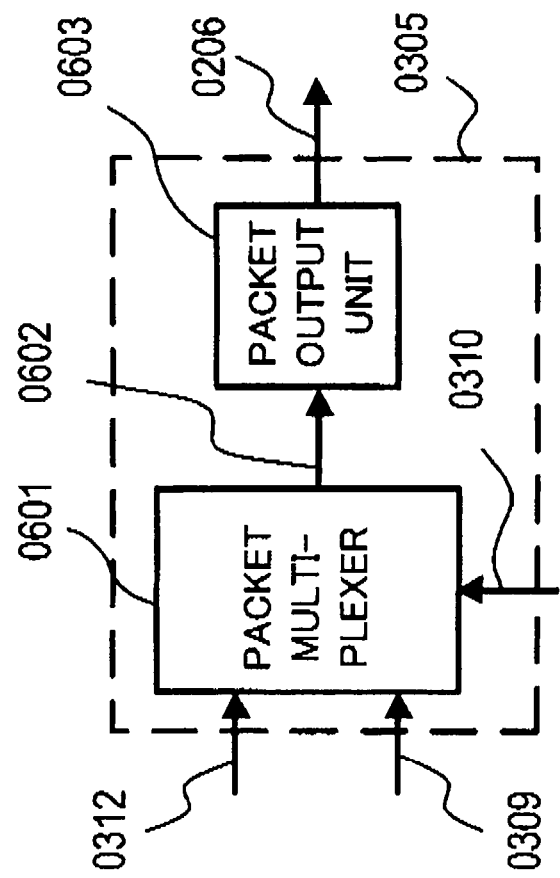
FIG. 6 is a diagram representing a configuration example of a packet output unit.

FIG. 6 is a diagram showing a configuration example of the packet output unit 0305. This configuration is a configuration including a packet multiplexer 0601 which selects one of an output 0312 from the packet buffer 0303 and an output 0310 from the notification packet generation unit 0304, according to a control signal 0309 from the virus filter control unit 0301, and a packet output unit 0603 which performs shaping of the packet for output or output control. The packet multiplexer 0601 and the packet output unit 0603 are connected via a wiring 0602.

Figure 7:
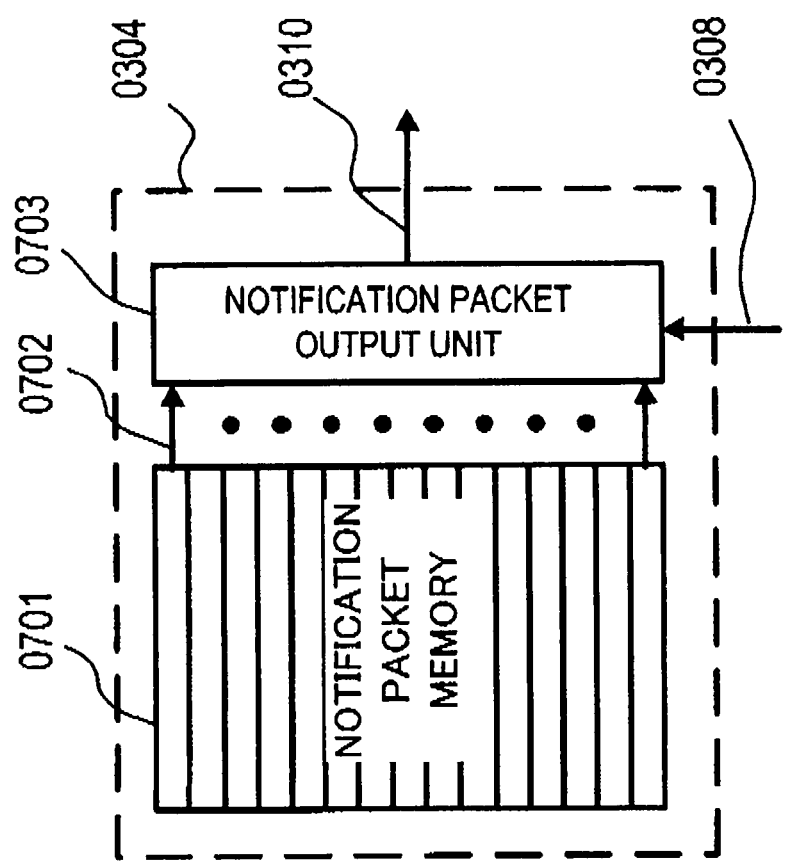
FIG. 7 is a diagram representing a configuration example of a notification packet generation unit.

FIG. 7 is a diagram showing a configuration example of the notification packet generation unit 0304. This configuration is provided with a notification packet memory 0701 which stores the notification packet or its template, and a notification packet output unit 0703 which selects contents of the notification packet memory 0701 according to the wiring 0308 transmitting an instruction from the virus filter control unit 0301 and arranges the contents for output. The notification packet memory 0701 and the notification packet output unit 0703 are connected via wirings 0702.

Figure 8:
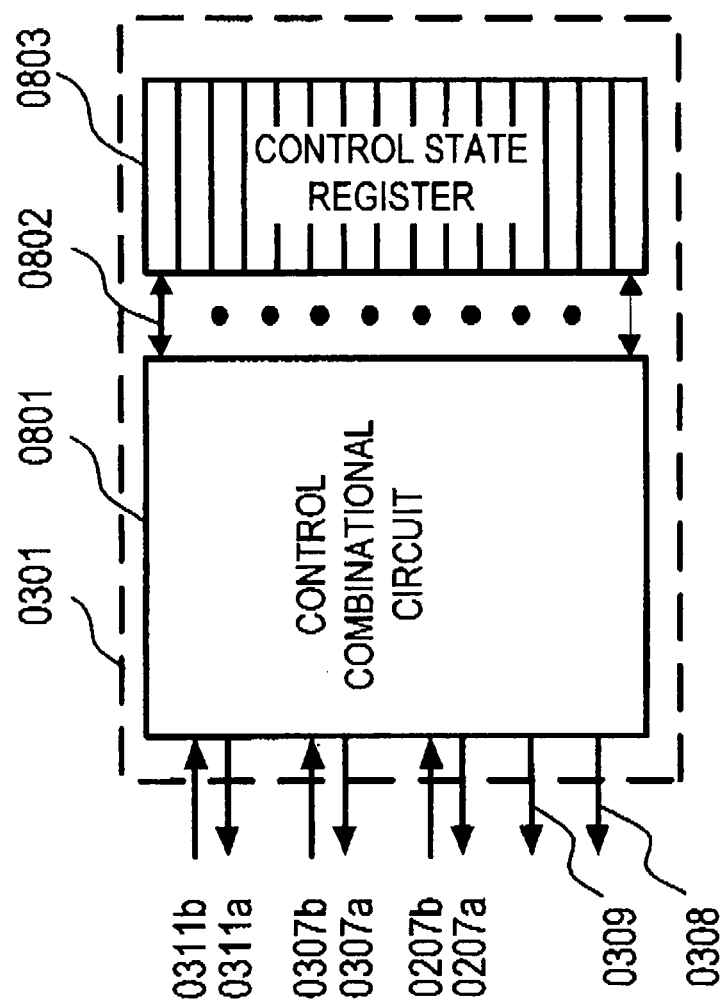
FIG. 8 is a diagram showing a configuration example of a virus filter control unit.

FIG. 8 is a diagram showing a configuration example of the virus filter control unit 0301. This configuration is provided with a control combinational circuit 0801 which generates a control signal for controlling other parts within the virus filter 0201 and takes charge of state transition, and a control state register 0803 which holds a state of the virus filter control unit. The control combinational circuit 0801 and the control state register 0803 are connected via wirings 0802.

Figure 9:
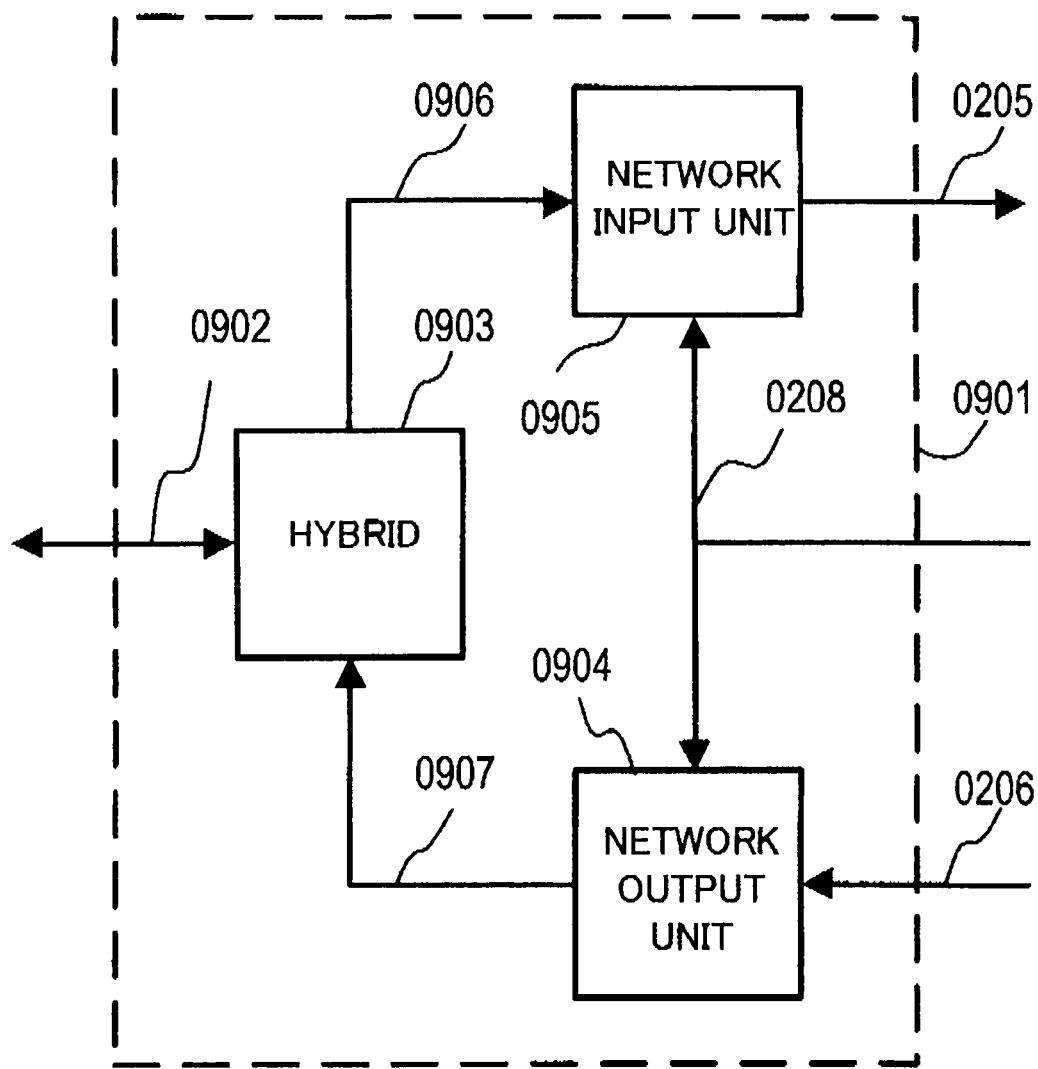
FIG. 9 is a diagram representing a configuration example of a LAN interface in the virus checking device according to an example of the present invention.

FIG. 9 is a diagram showing a configuration example of a network interface 0901. This configuration represents the entire network interface 0901, and is a configuration example of the network interface 0203 or another network interface 0204 in FIG. 2. A wiring 0902 corresponds to the communication network 0106 or another communication network 0107 in FIG. 1. A hybrid 0903 separates bidirectional network signal inputs and outputs to output the input from the wiring 0902 to a wiring 0906 and to output the input from a wiring 0907 to the wiring 0902. A network output unit 0904 and a network input unit 0905 perform processes as a physical layer in accordance with a network standard, respectively. These are connected via the update control unit 0202 and the wiring 0208, and temporarily stop a communication process at the time of updating the virus filter 0201 according to an instruction from the update control unit 0202.

The virus checker of the present invention may be installed to be embedded on the NIC integrated in the computer or a motherboard on which major components of the computer are implemented, or to be embedded in a device such as a router or a switching hub which is a network device. Moreover, the virus checker of the present invention may be installed to be inserted on the wiring of each network or the like implemented within the computer.

Hereinabove, the present invention has been described based on the shown examples. However, the present invention is not limited to the above described examples, and also includes other configurations which can be easily modified by those skilled in the art within the range of the claims.

In the above description, in order to make the description concise, it has been assumed that the fixed pattern matching unit is the pure logical circuit (that is, the logical circuit not including the CPU operating with the program) which has been designed based on the known collation patterns. However, it is not necessary to limit the fixed pattern matching unit thereto, and the pattern matching can also be performed by an arithmetic processing unit in a programmed manner. In this case, an arithmetic processing time can be saved by performing the pattern matching with a logical operation in accordance with a logical formula configured based on the known collation patterns. In the case of operations in the arithmetic processing unit in the programmed manner as described above, the pattern matching can be performed in a short period of time by inputting packet data to the logical formula in which filtering information has been incorporated and performing the logical operation, instead of invoking the filtering information stored in a storage device and performing sequential comparison. A method of creating such a logical formula has already been well known.

Moreover, it is not necessary to limit application of the above described packet data comparator to the packet on the network, and for example, the packet data comparator is also applicable to a data path between an MPU and a hard disk unit of the personal computer.

Moreover, it is apparent that the present invention is applicable not only to the computer virus but also to detection of packet data having a specific pattern.

What is claimed is:

1. A packet data comparator which detects match or mismatch between packet data inputted from a data path connecting among information processing means and stored data, comprising:
   branch means which branches the inputted packet data into at least first, second and third branched packet data to perform processing in parallel;
   an additional pattern matching unit which has a function of comparing the first branched packet data with a part of the stored data, and performs matching with collation patterns stored in a rewritable storage area;
   a fixed pattern matching unit which has the function of comparing the second branched packet data with the part of the stored data without using any operating system, and performs the matching with a logical operation by hardware processing using a logical device which has been configured based on known collation patterns;
   a notification packet matching unit which has the function of comparing the third branched packet data with the part of the stored data, and detects a notification packet; and
   a match detection aggregation unit which aggregates respective matching results from said additional pattern matching unit, said fixed pattern matching unit and said notification packet matching unit,
   wherein the fixed pattern matching unit has less delay and performs the monitoring more rapidly than the additional pattern matching unit, and
   a result in which the match or the mismatch has been detected is outputted from said match detection aggregation unit.

2. The packet data comparator according to claim 1, wherein the logical operation performed in said fixed pattern matching unit is a logical operation performed by a programmed processing unit in a programmed manner.

3. A virus filter which detects a computer virus in a data path, comprising:
   a packet buffer which temporarily stores an inputted packet; a packet data comparator according to any of claim 1 or 2 which compares packet data stored in said packet buffer with stored filtering information;
   packet output means which outputs a packet which is caused to pass through; and
   a virus filter control unit which controls said packet buffer, said packet data comparator and said packet output means, wherein the computer virus included in the packet data inputted from the data path is detected, and the packet data in which the virus has been detected is not outputted.

4. The virus filter according to claim 3, further comprising a notification packet generation unit which generates a notification packet for notifying a result of the comparison in said packet data comparator to said information processing means.

5. A virus checker, comprising:
   first interface means and second interface means which are connected to a data path, respectively;
   a virus filter according to claim 4 which is an upward virus filter and performs filtering of a packet signal in an uplink from said first interface means toward said second interface means;
   a virus filter according to claim 4 which is a downward virus filter and performs filtering of a packet signal in a downlink from said second interface means toward said first interface means; and
   update control means which provides upward and downward filtering information to said upward and downward virus filters, respectively,
   wherein a virus in a bidirectional data path is detected.

6. A network system in which a data path is a network, comprising:
   a virus checker according to claim 5 which is connected to said network;
   information processing means which is connected to said network via said virus checker;
   a virus information data server which is connected to said network and provides virus information; and
   a virus checker update server which is connected to said network and updates information stored in said virus checker,
   wherein said network system comprises a virus checker which can be updated through the network.

7. A virus checker, comprising:
first interface means and second interface means which are connected to a data path, respectively;
a virus filter according to claim 3 which is an upward virus filter and performs filtering of a packet signal in an uplink from said first interface means toward said second interface means;
a virus filter according to claim 3 which is a downward virus filter and performs filtering of a packet signal in a downlink from said second interface means toward said first interface means; and
update control means which provides upward and downward filtering information to said upward and downward virus filters, respectively, wherein a virus in a bidirectional data path is detected.

8. A network system in which a data path is a network, comprising:
a virus checker according to claim 7 which is connected to said network;
information processing means which is connected to said network via said virus checker;
a virus information data server which is connected to said network and provides virus information; and
a virus checker update server which is connected to said network and updates information stored in said virus checker,
wherein said network system comprises a virus checker which can be updated through the network.

9. The network system according to claim 8, wherein the virus checker is embedded on a network interface card (NIC) of the information processing means.

10. A virus checker, comprising:
first interface means and second interface means which are connected to a data path, respectively;
a virus filter according to claim 3 which is an upward virus filter and performs filtering of a packet signal in an uplink from said first interface means toward said second interface means;
a virus filter according to claim 3 which is a downward virus filter which performs filtering of a packet signal in a downlink from said second interface means toward said first interface means, and which further comprises a notification packet generation unit which generates a notification packet for notifying a result of the comparison in said packet data comparator to said information processing means; and
update control means which provides upward and downward filtering information to said upward and downward virus filters, respectively,
wherein a virus in a bidirectional data path is detected.

11. A network system in which a data path is a network, comprising:
a virus checker according to claim 10 which is connected to said network;
information processing means which is connected to said network via said virus checker;
a virus information data server which is connected to said network and provides virus information; and
a virus checker update server which is connected to said network and updates information stored in said virus checker,
wherein said network system comprises a virus checker which can be updated through the network.

12. A virus checker, comprising:
first interface means and second interface means which are connected to a data path, respectively;
a virus filter according to claim 3 which is an upward virus filter and performs filtering of a packet signal in an uplink from said first interface means toward said second interface means, and which further comprises a notification packet generation unit which generates a notification packet for notifying a result of the comparison in said packet data comparator to said information processing means;
a virus filter according to claim 3 which is a downward virus filter and performs filtering of a packet signal in a downlink from said second interface means toward said first interface means; and
update control means which provides upward and downward filtering information to said upward and downward virus filters, respectively,
wherein a virus in a bidirectional data path is detected.

13. A network system in which a data path is a network, comprising:
a virus checker according to claim 12 which is connected to said network;
information processing means which is connected to said network via said virus checker;
a virus information data server which is connected to said network and provides virus information; and
a virus checker update server which is connected to said network and updates information stored in said virus checker,
wherein said network system comprises a virus checker which can be updated through the network.

* * * * *